(12) United States Patent
Lee

(10) Patent No.: US 8,510,962 B2
(45) Date of Patent: Aug. 20, 2013

(54) ANGLE SENSOR

(75) Inventor: Changhwan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 158 days.

(21) Appl. No.: 13/242,032

(22) Filed: Sep. 23, 2011

(65) Prior Publication Data

US 2012/0260510 A1    Oct. 18, 2012

(30) Foreign Application Priority Data

Apr. 15, 2011    (KR) .................. 10-2011-0034960

(51) Int. Cl.
    *G01B 21/22*    (2006.01)
(52) U.S. Cl.
    USPC ............................................ 33/1 N; 33/1 PT
(58) Field of Classification Search
    USPC .................................................. 33/1 N, 1 PT
    See application file for complete search history.

(56) References Cited

U.S. PATENT DOCUMENTS

| | | | | |
|---|---|---|---|---|
| 5,242,309 A | * | 9/1993 | Hasegawa ........................ | 439/15 |
| 5,647,753 A | * | 7/1997 | Ishikawa et al. ............. | 439/689 |
| 5,930,905 A | * | 8/1999 | Zabler et al. .................. | 33/1 PT |
| 6,299,453 B2 | * | 10/2001 | Matsumoto ..................... | 439/15 |
| 6,732,438 B2 | * | 5/2004 | Enzinna ........................ | 33/1 PT |
| 6,737,638 B2 | * | 5/2004 | Schmidt et al. ................ | 33/1 PT |
| 6,983,647 B2 | * | 1/2006 | Nagaoka et al. ................ | 33/1 N |
| 7,200,515 B2 | * | 4/2007 | Sakabe et al. ................. | 33/1 PT |
| 7,447,580 B2 | * | 11/2008 | Lee ............................. | 33/1 PT |
| 7,765,702 B2 | * | 8/2010 | Schirp et al. .................. | 33/1 N |
| 7,798,816 B2 | * | 9/2010 | Oishi ........................... | 439/15 |
| 2003/0177649 A1 | * | 9/2003 | Ito et al. ...................... | 33/1 PT |
| 2009/0317994 A1 | * | 12/2009 | Oishi ........................... | 439/164 |
| 2012/0260510 A1 | * | 10/2012 | Lee ............................. | 33/1 N |

* cited by examiner

*Primary Examiner* — Yaritza Guadalupe-McCall
(74) *Attorney, Agent, or Firm* — Saliwanchik, Lloyd & Eisenschenk

(57) ABSTRACT

Disclosed is an angle sensor configured to compensate eccentricity of a main gear rotated by a rotating shaft, thus inhibiting abrasion of a gear and reduction in tooth strength and thereby improving operational reliability and durability, the angle sensor including a housing formed with a space for allowing a rotating shaft to pass, a coupling member disposed in the housing and coupled with the rotating shaft to rotate along with the rotating shaft, a ring-shaped main gear coupled to an outer circumference of the coupling member and rotated along with the coupling member, a subsidiary gear meshed with the main gear, an inner protrusion protruding inwards from an inner circumference of the main gear, and a groove formed in the coupling member, the inner protrusion being inserted into the groove to transmit a rotating force from the coupling member to the main gear.

7 Claims, 3 Drawing Sheets

ANGLE SENSOR

CROSS-REFERENCE TO RELATED APPLICATION

This application claims the benefit under 35 U.S.C. §119 of Korean Application No. 10-2011-0034960, filed Apr. 15, 2011, which is hereby incorporated by reference in its entirety.

BACKGROUND OF THE INVENTION

1. Field of the Invention

The present invention relates generally to angle sensors and, more particularly, to an angle sensor, configured to compensate eccentricity of a main gear rotated by a rotating shaft, thus inhibiting abrasion of a gear and reduction in tooth strength and thereby improving operational reliability and durability.

2. Description of the Related Art

Generally, an auxiliary steering system supported by additional power is used as a device for ensuring steering stability of a vehicle. Conventionally, the auxiliary steering system uses a hydraulic pressure. However, an electronic power steering system, which consumes less power and is excellent in accuracy, has been recently used.

Such an electronic power steering system (EPS) drives a motor by an electronic control unit depending on driving conditions detected by a vehicle speed sensor, an angle sensor and a torque sensor, thus ensuring turning stability and providing a rapid restoring force, and thereby allowing a driver to safely drive a vehicle.

The angle sensor is a device that outputs an electric signal in proportion to a rotation angle of a steering shaft. Recently, the angle sensor is frequently combined with the torque sensor measuring steering torque to form an assembly.

FIG. 1 is a plan view illustrating an example of the angle sensor.

In the case of the angle sensor, as a driver rotates a steering wheel, a main gear 20 attached to a steering shaft rotates in conjunction with the steering wheel, and there occurs a difference in rotation angle between input and output shafts of the steering shaft. At this time, a magnetic device detects magnetic fields and rotating directions of magnets 31 and 32 attached to subsidiary gears 21 and 22 engaging with the main gear 20, and thereafter sends a detected signal to an electronic control unit.

The main gear 20 and the subsidiary gears 21 and 22 are coupled to an interior of a housing 10. The main gear 20 is integrally formed with a coupling member by injection molding, or is coupled to the coupling member by bonding. Here, the coupling member is provided on a portion of the housing 10 through which a rotating shaft passes.

However, such a coupling structure is problematic in that, when vibration is transmitted to the housing or the coupling member, it leads to vibration of the main gear. Further, when eccentricity occurs with respect to the rotating shaft, gears may be worn out and strength may be lowered. Consequently, the vibration and eccentricity may cause the malfunction or damage of the entire angle sensor.

BRIEF SUMMARY

Accordingly, the present invention has been made keeping in mind the above problems occurring in the prior art, and an object of the present invention is to provide an angle sensor, which improves a main-gear coupling structure of the angle sensor, thus enabling rotation to be precisely transmitted even if vibration and eccentricity occur, and guaranteeing durability.

According to one aspect of this invention, there is provided an angle sensor, the angle sensor comprising: a housing formed with a space for allowing a rotating shaft to pass, a coupling member disposed in the housing and coupled with the rotating shaft to rotate along with the rotating shaft, a ring-shaped main gear coupled to an outer circumference of the coupling member and rotated along with the coupling member, a subsidiary gear meshed with the main gear, an inner protrusion protruding inwards from an inner circumference of the main gear, and a groove formed in the coupling member, the inner protrusion being inserted into the groove to transmit a rotating force from the coupling member to the main gear. Thus, the angle sensor is advantageous in that it can precisely transmit the rotating force from the coupling member to the main gear by the inner protrusion, and can more efficiently compensate for undesirable movement of the coupling member in comparison with a coupling structure using press-fitting or injection molding.

Further, the inner circumference of the main gear is spaced apart from the outer circumference of the coupling member to allow a central axis of the main gear to be eccentric from a central axis of the coupling member. Thus, a fine gap between the main gear and the coupling member can compensates for the eccentricity of the main gear, thus improving the durability of the gear.

Further, a sidewall of the inner protrusion is spaced apart from an inner wall of the groove. Thus, the angle sensor is advantageous in that it can smoothly compensate for the eccentricity.

Further, the groove is formed in an axial direction of the coupling member, and the main gear is coupled to the coupling member by sliding in a direction from an upper position to a lower position thereof. Thus, the angle sensor is advantageous in that it facilitates a coupling process and minimizes damage and defective coupling during assembly.

Further, two or more inner protrusions are disposed on the inner circumference of the main gear each at regular interval to a circumferential direction. Thus, it is possible to precisely transmit a rotating force.

As apparent from the above description, the angle sensor according to the present invention is configured so that the coupling member is interposed between the main gear and the rotating shaft to compensate for the eccentricity of the main gear rotated by the rotating shaft, the rotating force is transmitted from the coupling member to the main gear by means of the inner protrusion and the groove, and the coupling member and the main gear are spaced apart from each other to allow the central axis of the coupling member to be eccentric from that of the main gear. Such a configuration inhibits the gear from being worn out and inhibits tooth strength from being reduced, thus improving operational reliability and durability.

Further, the angle sensor can minimize a fatigue degree of a member and inhibit a defective assembly in comparison with a coupling structure using press-fitting or injection molding, thus increasing productivity.

DETAILED DESCRIPTION

Hereinafter, an angle sensor according to a preferred embodiment of the present invention will be described in detail with reference to the accompanying drawings.

Figure 2:
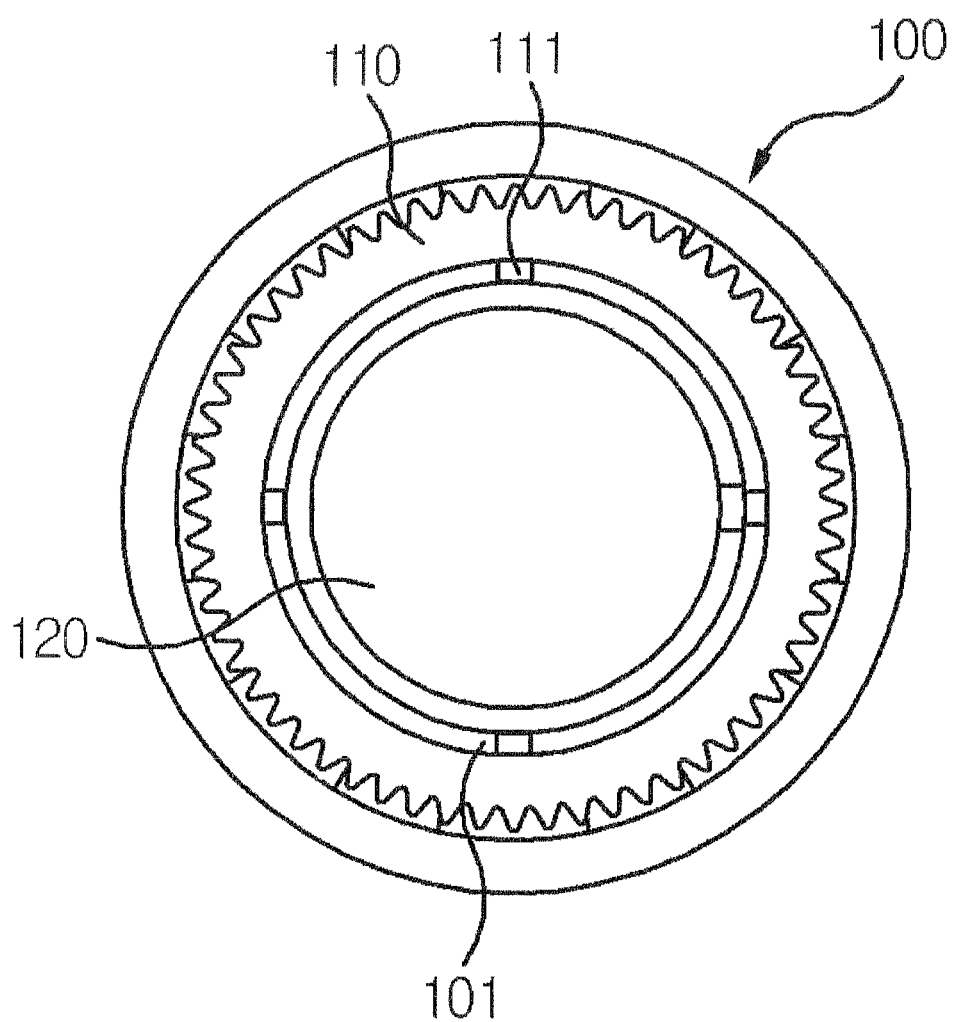
FIG. 2 is a plan view showing a main-gear coupling portion of an angle sensor in accordance with an exemplary embodiment of the present invention.
Figure 3:
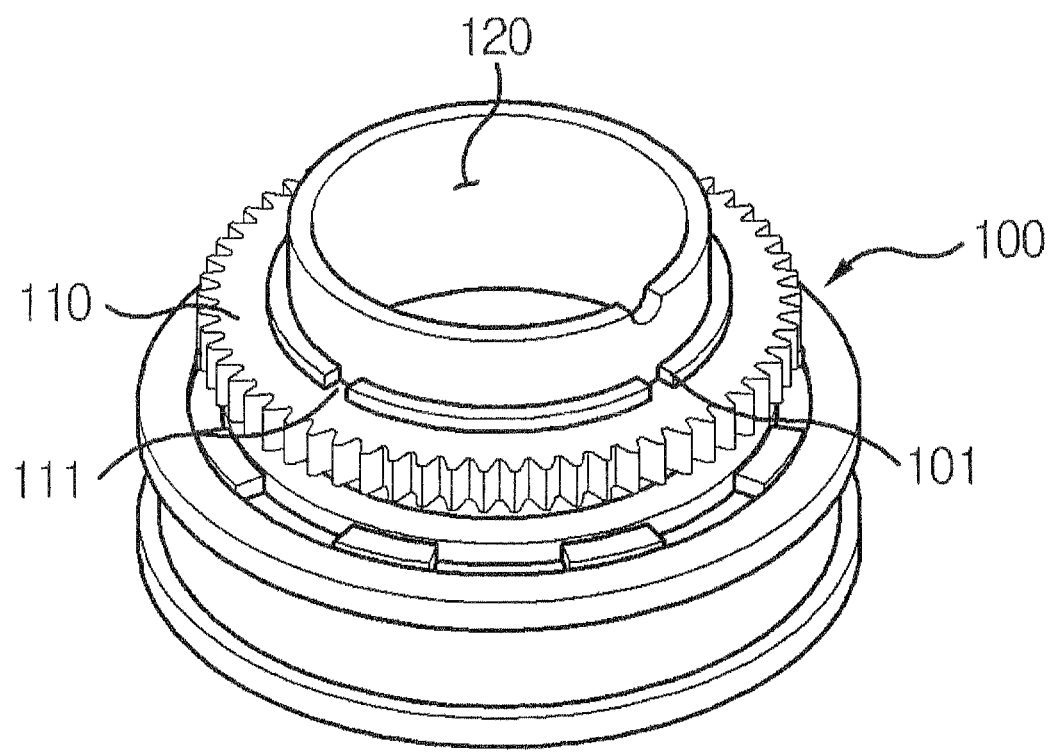
FIG. 3 is a perspective view showing the main-gear coupling portion of the angle sensor in accordance with the exemplary embodiment of the present invention.

FIG. 2 is a plan view showing a main-gear coupling portion of an angle sensor in accordance with an exemplary embodiment of the present invention, and FIG. 3 is a perspective view showing the main-gear coupling portion of the angle sensor in accordance with the exemplary embodiment of the present invention.

The angle sensor is provided with main and subsidiary gears in housing. Further, the angle sensor includes magnetic members connected to the gears, a Hall IC detecting magnetic variation, and a printed circuit board (PCB).

The housing may be mounted on a rotating shaft of a steering wheel, and is fixedly disposed regardless of rotation of the rotating shaft without hindering the rotating shaft from rotating.

The main gear 110 has a plurality of teeth on a ring-shaped outer circumference thereof, and is connected at a central portion thereof to the rotating shaft to be rotated along with the steering wheel when it rotates.

This invention will be described herein with reference to the angle sensor of the steering wheel, as an example. However, it is noted that the angle sensor according to the concept of the present invention may be used to measure angles of various rotating shafts or rotary members.

Figure 1:
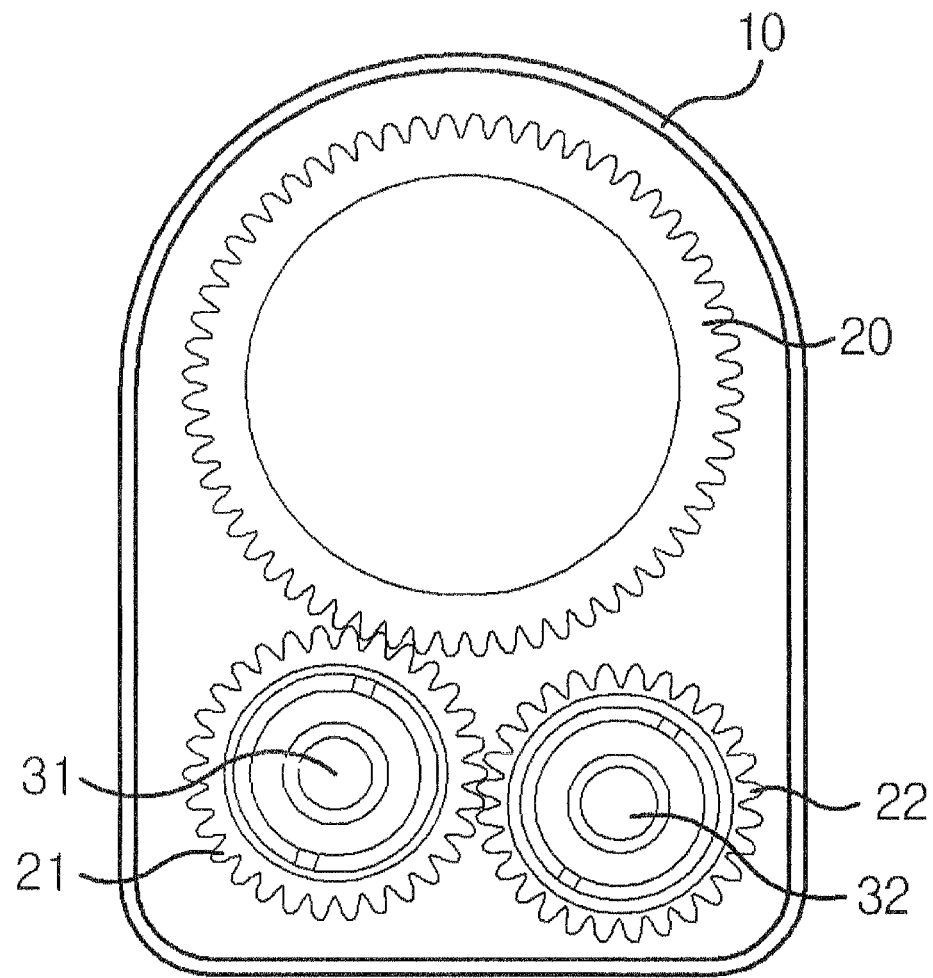
FIG. 1 is a plan view showing a conventional angle sensor.

A first subsidiary gear 21 (see FIG. 1) engaging with the main gear 110 is rotated by rotation of the main gear 110, that is, rotation of the rotating shaft. A rotation ratio of the main gear 110 to the first subsidiary gear 21 is in reverse proportion to a ratio of teeth between the main gear 110 and the first subsidiary gear 21.

A second subsidiary gear 22 (see FIG. 1) engages with the first subsidiary gear 21 to be rotated by the rotation of the first subsidiary gear 21. The subsidiary gears 21 and 22 are provided with magnets 31 and 32 to change magnetic fields by rotation.

A change in magnetic field is detected by the Hall IC accommodated in the housing 10 and used as a parameter for detecting a rotating angle or a rotating angular velocity.

Meanwhile, in consideration of performance of the angle sensor and a signal processing algorithm of the angle sensor, the first subsidiary gear and the second subsidiary gear may be omitted, the second subsidiary gear may engage with the main gear, and three or more subsidiary gears may be provided if necessary.

A coupling member 100 is interposed between the main gear 110 and the rotating shaft.

According to the concept of the present invention, both the coupling member 100 and the main gear 110 are mechanically rotated together, but the coupling member 100 and the main gear 110 are coupled to each other to have a gap therebetween.

To be more specific, the coupling member 100 approximately takes a shape of a cylinder. A lower portion of the coupling member 100 is coupled to the housing 10, while the main gear 110 is coupled to an outer circumference of an upper portion of the coupling member 100.

A central portion of the coupling member 100 is hollow, and has a shaft insertion hole 120 to be coupled to the rotating shaft. Since the coupling member 100 rotates along with the rotating shaft, it is preferable that a central axis of the rotating shaft be aligned with a central axis of the coupling member 100.

As described above, when the rotating shaft is eccentric from the central axis of the coupling member 100 or vibration occurs, gear teeth may be worn out or reduced in strength.

A fine gap exists between an inner circumference of the main gear 110 and the outer circumference of the upper portion of the coupling member 100 coupled to the main gear 110. Thus, even if the coupling member 100 itself vibrates or is eccentric, the main gear 110 can precisely maintain engagement with the subsidiary gear. This results in improvement on operational reliability and durability.

In order to maintain a coupling force between the coupling member 100 and the main gear 110 in a rotating direction, inner protrusions 111 are provided on the inner circumference of the main gear 110 in such a way as to protrude inwards therefrom.

Grooves 101 are formed at predetermined positions of the coupling member 100 to correspond to the inner protrusions 111 of the main gear 110. The inner protrusions 111 are caught by the grooves 101, thus transmitting a rotating force from the coupling member 100 to the main gear 110.

The main gear 110 may be coupled to the coupling member 100 by sliding in a direction from an upper position to a lower position of the coupling member 100. In this case, each groove 101 is formed to be parallel to an axial direction of the coupling member 100, and each inner protrusion 111 of the main gear 110 is inserted into the groove 101 in a direction from an upper position to a lower position thereof.

FIG. 2 shows an example wherein four inner protrusions 111 are formed on the inner circumference of the main gear 110 at regular intervals. However, a single inner protrusion 111 may be formed, or two or more inner protrusions 111 may be selectively formed along the inner circumference of the main gear 110.

According to the present invention, there is the fine gap between the inner circumference of the main gear 110 and the outer circumference of the coupling member 100 to compensate for vibration and eccentricity of the coupling member 100 with respect to the rotating shaft. In order to smoothly compensate for the eccentricity, there may be a gap between the inner protrusion 111 and the groove 101, and the inner protrusion 111 may have a conical or hemispherical shape.

In a detailed description, a fine gap exists between a side wall of the inner protrusion 111 and an inner wall of the groove 101. Such a gap is advantageous in that it allows the central axis of the main gear 110 to be eccentric from the central axis of the coupling member 100.

The angle sensor according to the present invention is configured so that the coupling member 100 is interposed between the main gear 110 and the rotating shaft to compensate for the eccentricity of the main gear 110 rotated by the rotating shaft, the rotating force is transmitted from the coupling member 100 to the main gear 110 by means of the inner protrusion 111 and the groove 101, and the coupling member 100 and the main gear 110 are spaced apart from each other to allow the central axis of the coupling member 100 to be eccentric from that of the main gear 110. Such a configuration inhibits the gear from being worn out and inhibits tooth strength from being reduced, thus improving operational reliability and durability.

As described above, it should be understood that the angle sensor of the present invention embraces a device for measuring the rotation of the rotating shaft of the steering wheel, the rotating angle or angular velocity of a rotary member or device. The structure of coupling the main gear with the coupling member may be naturally applied to the subsidiary gear.

The present invention has been described with reference to embodiments and the accompanying drawings. However, it is to be understood that the scope of the invention is not limited by the specific embodiments and drawings except as defined in the appended claims.

What is claimed is:

1. An angle sensor, comprising:
   a housing formed with a space for allowing a rotating shaft to pass;
   a coupling member disposed in the housing, and coupled with the rotating shaft to rotate along with the rotating shaft;
   a ring-shaped main gear coupled to an outer circumference of the coupling member, and rotated by rotation of the coupling member;
   a subsidiary gear meshed with the main gear;
   an inner protrusion protruding inwards from an inner circumference of the main gear; and
   a groove formed in the coupling member, the inner protrusion being inserted into the groove to transmit a rotating force from the coupling member to the main gear.

2. The angle sensor as set forth in claim 1, wherein the inner circumference of the main gear is spaced apart from the outer circumference of the coupling member to allow a central axis of the main gear to be eccentric from a central axis of the coupling member.

3. The angle sensor as set forth in claim 2, wherein the groove is formed in an axial direction of the coupling member, and the main gear is coupled to the coupling member by sliding in a direction from an upper position to a lower position thereof.

4. The angle sensor as set forth in claim 1, wherein a sidewall of the inner protrusion is spaced apart from an inner wall of the groove.

5. The angle sensor as set forth in claim 4, wherein the groove is formed in an axial direction of the coupling member, and the main gear is coupled to the coupling member by sliding in a direction from an upper position to a lower position thereof.

6. The angle sensor as set forth in claim 1, wherein the groove is formed in an axial direction of the coupling member, and the main gear is coupled to the coupling member by sliding in a direction from an upper position to a lower position thereof.

7. The angle sensor as set forth in claim 1, wherein two or more inner protrusions are disposed on the inner circumference of the main gear each at regular interval to a circumferential direction.

* * * * *